US008457283B2

(12) United States Patent
Stählin et al.

(10) Patent No.: US 8,457,283 B2

(45) Date of Patent: Jun. 4, 2013

(54) METHOD AND DEVICE FOR INITIATING AN AUTOMATIC EMERGENCY CALL

(75) Inventors: Ulrich Stählin, Eschborn (DE); Harald Feifel, Darmstadt (DE)

(73) Assignee: Continental Teves AG & Co. oHG (DE)

(*) Notice: Subject to any disclaimer, the term of this patent is extended or adjusted under 35 U.S.C. 154(b) by 227 days.

(21) Appl. No.: 12/997,960

(22) PCT Filed: Jun. 18, 2008

(86) PCT No.: PCT/EP2008/057727

§ 371 (c)(1), (2), (4) Date: Dec. 14, 2010

(87) PCT Pub. No.: WO2009/152856

PCT Pub. Date: Dec. 23, 2009

(65) Prior Publication Data

US 2011/0096912 A1 Apr. 28, 2011

(51) Int. Cl.
*H04M 11/00* (2006.01)

(52) U.S. Cl.
USPC ............................. 379/39; 379/40; 455/404.1

(58) Field of Classification Search
USPC ............... 379/37, 39, 40; 455/404.1; 340/436
See application file for complete search history.

(56) References Cited

U.S. PATENT DOCUMENTS

| | | | | |
|---|---|---|---|---|
| 6,073,004 | A | 6/2000 | Balachandran | |
| 6,157,299 | A * | 12/2000 | Wang | 379/40 |
| 6,618,657 | B1 * | 9/2003 | Geil et al. | 340/436 |
| 7,508,298 | B2 * | 3/2009 | Pisz et al. | 379/45 |
| 2006/0084463 | A1 * | 4/2006 | Yoo et al. | 455/550.1 |
| 2007/0167147 | A1 * | 7/2007 | Krasner et al. | 455/404.2 |
| 2012/0108198 | A1 * | 5/2012 | Edge et al. | 455/404.2 |

FOREIGN PATENT DOCUMENTS

| | | | |
|---|---|---|---|
| DE | 43 21 416 | A1 | 1/1995 |
| DE | 10 2005 018 234 | B3 | 11/2006 |
| DE | 10 2006 022 525 | A1 | 11/2007 |
| EP | 1 372 324 | A2 | 12/2003 |

* cited by examiner

*Primary Examiner* — Stella Woo

(74) *Attorney, Agent, or Firm* — RatnerPrestia

(57) ABSTRACT

A method and an apparatus for initiating an automatic emergency call wherein an emergency signal is sent when an initiation threshold is reached which is ascertained on the basis of a sensor signal. To prevent the incorrect transmissions of emergency calls and nevertheless to take account of a multiplicity of hazard situations, when the initiation threshold is reached an emergency call is initiated and additionally the reliability of the sensor signals prompting the initiation are assessed. When the sensor signals cannot be interpreted explicitly the emergency call is transmitted only after a delay time. During the delay time, the transmission of the emergency call can still be terminated.

8 Claims, 1 Drawing Sheet

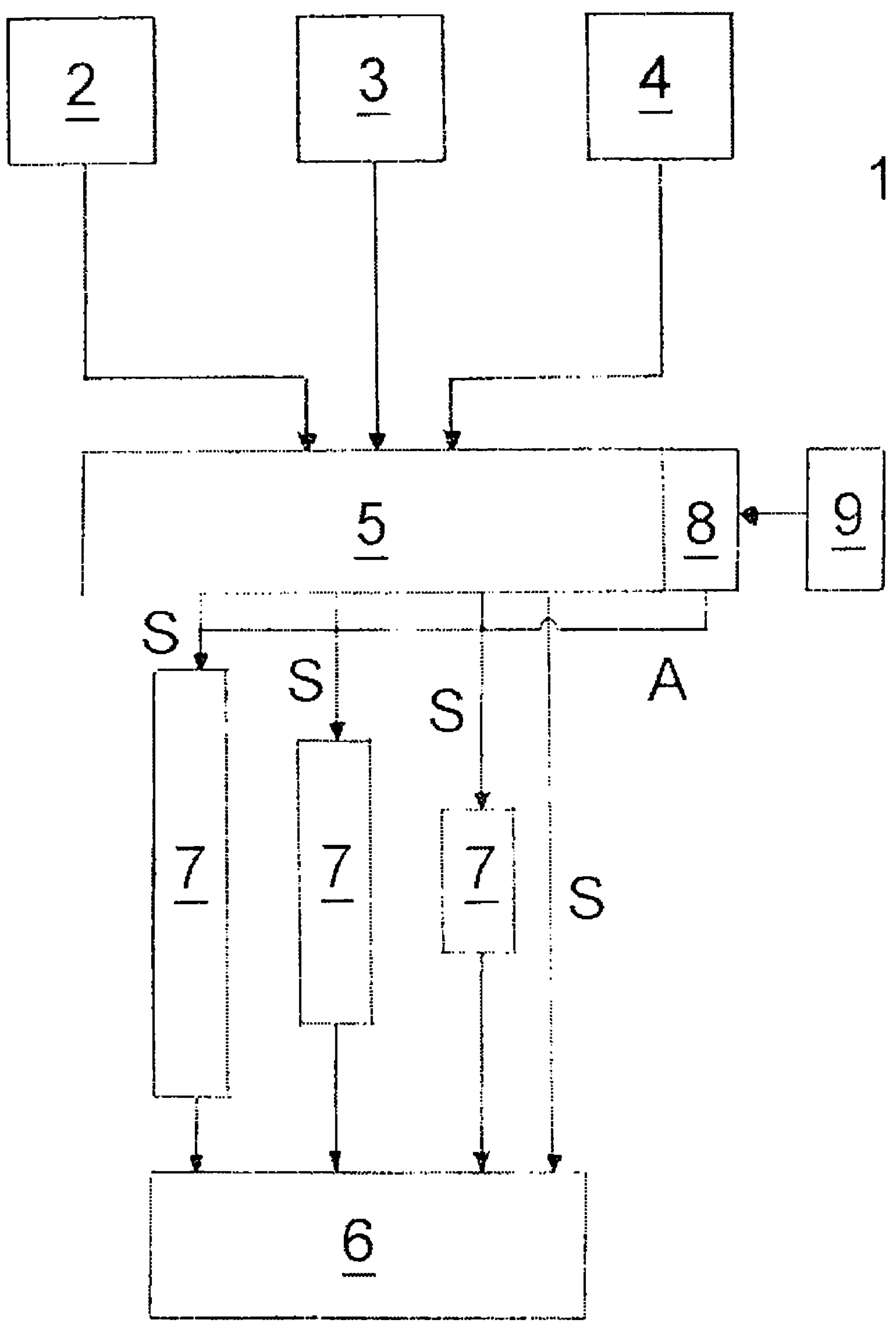
2
3
4
1
5
8
9
S
S
S
A
7
7
7
S
6

METHOD AND DEVICE FOR INITIATING AN AUTOMATIC EMERGENCY CALL

CROSS REFERENCE TO RELATED APPLICATIONS

This application is the U.S. National Phase Application of PCT International Phase Application No. PCT/EP2008/057727, filed Jun. 18, 2008, the contents of such application being incorporated by reference herein.

FIELD OF THE INVENTION

The invention relates to a method and an apparatus for initiating an automatic emergency call, in which the emergency signal is sent when an initiation threshold is reached which is ascertained on the basis of a sensor signal or preferably a plurality of different sensor signals and signifies a kind of probability of a serious accident having occurred.

BACKGROUND OF THE INVENTION

With the introduction of telematic systems, provision has been made, particularly in connection with navigation systems, which know the position of a vehicle, for a serious accident, in which injuries to the people in the vehicle involved in the accident can be expected, to automatically prompt an emergency call to be sent in order to save valuable time in rescuing the people involved in the accident. This is frequently done using mobile radio links.

In this case, it is necessary to ensure that the vehicles contain a suitable sensor system which, on the one hand, reliably prompts the sending of an emergency call in the event of a serious accident but, on the other hand, does not send any erroneous emergency calls, for example, when an accident does not actually arise following a critical driving situation. In this regard, various systems have already been proposed.

EP 1 372 324 A2, which is incorporated herein by reference, describes a portable radio communication terminal which has a radio transmitter and receiver, a microphone, a loudspeaker and a light emitter. In the normal mode of operation, activation of the system prompts the loudspeaker, the microphone and the light emitter to be switched on in order to allow communication with a preselected call center. In a static mode of operation, the loudspeaker and the light emitter are switched off and the microphone is switched on in the event of activation so that the user can inform the call center about his state even in a situation in which he is no longer readily able to operate the appliance.

DE 10 2005 018 234 B3, which is incorporated herein by reference, discloses emergency systems in which, in the event of a hazard situation, a first hazard message with the position of the vehicle is reported to a control center. If the outcome of this hazard message is not an accident, an all-clear message is sent shortly afterwards. This practice is highly prone to trouble, however. In addition, it is known practice to ascertain the degree of probability of an accident and to use it as a limit value for sending an emergency signal. When the emergency call has been sent, a timer is activated. If there is no specific accident message available when the timer runs out, the emergency call is automatically revoked. A proposed system which is totally independent of the vehicle electronics is an emergency system which detects the release of an airbag using a microphone and possibly independently discharges an emergency call.

DE 43 21 416 A1, which is incorporated herein by reference, discloses a vehicle emergency system in which the vehicle is equipped with an active position-finding device, with a crash sensor and with an emergency transmitter. The position finding device continually ascertains the current position of the vehicle and transmits it to the emergency transmitter, which stores the position until a more up-to-date position is transmitted. In the event of an accident, the crash sensor checks whether an emergency call needs to be sent, and releases the emergency call if appropriate. The emergency transmitter then transmits the emergency call with the currently stored position.

A drawback of this is that the transmission of the emergency call is prompted by a crash sensor, typically the airbag sensor, which means that if there is a fault in the sensor then no emergency call is transmitted. In addition, to prevent false alarms, the initiation threshold needs to be set very high. This has the result that in some emergency situations, in which the sensor (still) does not initiate, no emergency call is transmitted even though this would be appropriate. The other systems, in which just relatively low accident probability prompts emergency calls to be discharged which possibly need to be revoked, are not manageable in practice, since rescue centers need to react to an incoming emergency call immediately and cannot first await whether an emergency call is revoked.

SUMMARY OF THE INVENTION

It is therefore an object of at least one aspect of the present invention to propose a system for initiating emergency calls which has an improved response characteristic which reliably sends an emergency call in hazard situations and prevents false alarms.

The invention achieves this object by means of the features described herein. In this regard, the method described at the outset has provision for an emergency call to be sent when the initiation threshold is reached and additionally for the reliability of the sensor signals prompting the initiation to be assessed, wherein when sensor signals cannot be interpreted explicitly, i.e. reliability is not sufficiently high, the emergency call is transmitted only after a delay time, and wherein during this delay time the transmission of the emergency call can be terminated. This practice allows even sensor signals which are not reliable by themselves to be used for initiating an emergency call, for example message data in an ESP stabilization system which indicates hazardous driving situations without providing any direct indication of the occurrence or the seriousness of an accident, as is typically possible when an airbag is released. The consideration of such sensor signals too and particularly a combination of different sensor signals that possibly reach the level of the initiation threshold, including only when combined, significantly improves the reliability of the automatic emergency system, on the one hand, and secondly prevents false alarms from being sent, since the transmission of the emergency call, once initiated, can still be terminated during the delay time. This termination can be performed manually in all cases. In addition, an aspect of the invention may provide for automatic termination, for example if the sensor system establishes that the vehicle returns to a normal operating state and has resumed normal driving operation after a hazard situation which is likely to result in an accident. Conversely, the initially delayed transmission of an emergency call can also take place immediately on the basis of further sensor signals, possibly after confirmation by the driver.

According to one exemplary embodiment of the method, the duration of the delay time is dependent on the reliability of the sensor signals prompting the initiation. The degree of reliability may be adjustable on the basis of prescribable criteria for various sensor signals. In this context, the delay time is chosen to be longer the more unsafe the sensor signals have to be rated. To this end, the duration of the delay time can be ascertained in a lookup table of a control device for the initiation of the automatic emergency call on the basis of the degree of reliability and/or the probability of the accident. In accordance with an aspect of the invention, the probability of an accident and the degree of reliability may match. Preferably, however, a separate assessment is made, since this allows better distinction between situations which are critical in terms of driving dynamics, on the one hand, and the reliability of the individual sensors which indicate these situations. If, by way of example, a plurality of sensors for which reliability is classified only as low concurrently indicate a critical driving situation or an accident, the probability of an accident having occurred with the relevant level of seriousness is very high. This can be ascertained better if a distinction is drawn between the reliability of the sensor and the probability of accident. Conversely, the delay time is naturally shorter the higher the reliability of the sensors and/or the probability of an accident is rated. Typical delay times in line with an aspect of the invention are in a range from a few seconds to approximately half a minute, preferably in the range from approximately 4 to 10 seconds. Typically, these delay times are sufficient in order to provide either the driver or the system with the option, on the basis of further obtained sensor information, of terminating an emergency call. On the other hand, the proposed delay time of this length extends the sending of the emergency call only to an insignificant degree. This does not result in appreciable problems in practice.

In line with one preferred refinement of the method, it is proposed that further sensor signals be evaluated during the delay time too and that the delay time be shortened if a reliable or more reliable sensor signal is available. A reliable sensor signal, which makes it possible to infer with certainty that a serious accident has occurred, allows the delay time to be terminated immediately too or the countdown to be stopped. The effect achieved by this is that the emergency signal is transmitted immediately after a reliable signal is available, and no unnecessary time needs to be waited.

In a further embodiment of the invention, provision may be made for the transmission of an emergency call to be confirmed before the delay time elapses. This also results in immediate termination of the delay and in direct transmission of the emergency signal. This can be understood against the background that, in line with one preferred refinement of the method, the vehicle occupants, such as the driver, are directly notified, when the initiation threshold is reached, that an emergency call has been initiated and is being transmitted in the like-wise communicated delay time, which can preferably also be counted down in the manner of a countdown. This output can be issued via the HMI (Human Machine Interface) of the vehicle, for example in a driver information display and/or by means of output on loudspeakers in the audio system of the vehicle. Early confirmation thus allows the driver to shorten the delay time if he wishes to transmit an emergency call.

For safety reasons, in line with one particularly preferred refinement of the method, provision is also made for the termination of an automatically produced emergency call to require double confirmation. This preferably presupposes a plurality of different actions by the driver or by a vehicle occupant. Examples are the actuation of a particular key combination in the HMI (Human Machine Interface), the input of a password using keys and/or voice recognition or another staggered actuation signal in order to be able to prevent unintentional termination of an emergency call with certainty.

Since even hazard situations which have not involved an accident normally result in a high level of excitement in the driver, it can be proposed in line with an aspect of the invention that, after first confirmation of the termination of an automatically initiated emergency call, the delay time is extended so that more time is available for the required second confirmation. This takes account of the fact that the driver sometimes cannot deal with both confirmations in the envisaged manner in good time after hazard situations.

So as not to allow any unnecessary delays to arise, an aspect of the invention may provide for a communication device to be activated during the delay time for the purpose of transmitting the emergency call, said communication device having previously been in a standby or sleep mode, for example. Frequently, the communication device will be a mobile radio device in the vehicle. It is thus possible, as early as during the countdown phase, i.e. the delay time, for a network operator SIM card which is still in sleep mode (sleeping SIM) to be awoken and registered in the mobile radio network. A sleeping SIM is normally not registered in the mobile radio network. Registering it takes a certain time, however. The delay time can be put to very good use for this purpose, since registration needs to take place before the emergency call (Ecall) is transmitted anyway. An aspect of the invention therefore allows the emergency call normally to be sent without further waiting times after the delay time has elapsed. Conversely, the waiting time which arises anyway when a sleeping SIM card is registered is used to perform the additional function of terminating the emergency call under certain conditions.

Another aspect of the invention also relates to an apparatus for initiating an automatic emergency call having a control device which is set up to send the emergency signal when an initiation threshold is reached and to ascertain the initiation threshold on the basis of one or more possibly also different sensor signals. The proposed apparatus is set up to perform the method steps described above, individually or in any combination. To this end, an aspect of the invention provides for the control device to be set up to initiate an emergency call when the initiation threshold is reached and additionally to assess the reliability of the sensor signal(s) prompting the initiation, the emergency call being transmitted by a transmission device only after a delay time by means of a delay device when sensor signals cannot be interpreted explicitly. During the delay time, the transmission of the emergency call may be terminated.

In order to prevent inadvertent termination of a correctly initiated emergency call, provision may be made for an input device to be provided for the purpose of terminating the transmission of an emergency call using two different actuation devices, which preferably both need to be actuated in order to terminate the transmission of the emergency signal. By way of example, key input and voice input of a password, the latter using a microphone, may be required for this purpose. Naturally, it is also possible to actuate various keys on the HMI in a prescribed order in order to terminate the transmission of the emergency call.

Further advantages, features and opportunities for application of aspects of the present invention can also be found in the description below of an exemplary embodiment and the drawing. In this case, all described and/or graphically illustrated features, independently or in any combination, form aspects of the subject matter of the present invention, regardless of their summary in the claims or the back-references therein.

BRIEF DESCRIPTION OF THE DRAWINGS

The invention is best understood from the following detailed description when read in connection with the accompanying drawings. Included in the drawings is the following figures:

FIG. 1 schematically shows a flowchart of the method sequence proposed in line with the invention.

DETAILED DESCRIPTION OF THE PREFERRED EMBODIMENTS

FIG. 1 schematically shows an apparatus 1 according to the aspects of the invention for automatically sending an emergency call on the basis of various sensor signals which are ascertained by sensors 2, 3 and 4. By way of example, the sensors 2, 3, 4 may be an airbag sensor which establishes when an airbag is released. In addition, the sensors may be sensors in an ESP stability system which ascertain driving dynamics properties of the vehicle. A sensor may also be a rollover sensor which senses when a motor vehicle rolls over. The invention is not limited to specific sensor types but rather can be used with all sensors in a motor vehicle which are suitable for detecting hazardous situations or accidents involving the motor vehicle.

In addition to possibly other devices to which the sensors 2, 3 and 4 are connected and to which they belong, the sensor signals are also supplied to a control device 5 which is set up to evaluate the sensor signals and to initiate an automatic emergency call when, on the basis of the sensor signals, an alarm or initiation threshold is reached which has been ascertained on the basis of one or more different sensor signals.

When the initiation threshold is reached, the control device 5 thus initiates an emergency call S and additionally assesses the reliability of the sensor signals from the sensors 2, 3 and 4 which prompt the initiation. Depending on the reliability of the sensors, an emergency signal S for direct transmission is transmitted to a transmission device 6 which transmits the emergency call using a mobile radio communication device, for example. This is done for sensor signals which make it possible to infer with certainty that an accident has occurred, for example the release of an airbag.

In the case of sensor signals which do not have the same reliability, the emergency signal S is, following initiation, first of all transmitted to a delay device 7 which waits a delay time before the emergency signal S is forwarded to the transmission device 6 and transmitted via the latter. This is illustrated in FIG. 1 by a different length of the delay devices 7 for different delay times.

The delay times proposed may be preferably in a range between 3 to 4 and 8 to 12 seconds. It is possible to use any increments and in specific cases also longer delay times. Preferably, the delay can be chosen steplessly. During the delay time, the transmission of the emergency call S can be terminated by a termination device 8 provided in the control device 5, which termination device transmits an appropriate termination signal A which results in the emergency signal S not being transmitted by the transmission device 6.

The termination device 8 is preferably controlled by an input device 9 which can be actuated by the driver of the motor vehicle or other vehicle occupants and which provides the option, for example by means of the HMI (Human Machine Interface) in the motor vehicle, of producing termination signals A for terminating the transmission of the emergency signals. To this end, following initiation of an emergency call S and transfer to the delay device 7, the control device 5 outputs visual and/or audible advice to the vehicle occupants that the emergency call has been initiated and is being transmitted after a delay time, which is preferably counted down in the manner of a countdown, if the transmission is not terminated by means of manual intervention. The driver then has the option of actuating the input device 9 and preventing the transmission of the emergency call.

To this end, provision may preferably be made for double actuation of various actuation elements of the input device 9 to have to be performed so that the termination device 8 produces the termination signal A in order to prevent inadvertent deactivation of the emergency call by the driver in the course of the excitement which prevails in the event of an accident.

In addition, the termination device 8 can also evaluate the signals from the sensors 2, 3 and 4 and automatically produce a termination signal A if the termination device 8 establishes that the vehicle still resumes normal driving operation after a hazard situation, signaled by the sensors 2, 3 and 4, which reached the initiation threshold for the transmission of an emergency call, which means that an accident has evidently not occurred.

The invention thus provides for a distinction to be drawn between various degrees of reliability of the initiation when an emergency call is initiated. In the case of signals from the sensors 2, 3 and 4 which are explicit enough to indicate an accident, the emergency signal S is sent by the transmission device 6 immediately. However, if the signal is not explicit or if there is the possibility of the initiation signal taking effect even when an emergency call is not supposed to be sent, the emergency signal S is initiated and is transmitted only after a delay. During this delay, the driver receives a message about the imminent initiation and is able to terminate it.

This delay or countdown phase is ever shorter the higher the reliability of the initiation on the basis of the evaluation of the sensor signals. This takes account of the urgency of safe initiation in the event of an actual accident.

When the driver terminates the transmission of the emergency signal, the transmission device 6 does not set up a connection to the previously envisaged service provider and does not transmit an Ecall. No data are transmitted. This means that there is no risk of the service provider recognizing the terminated emergency call and therefore making contact with the driver or initiating a rescue operation. This simplifies the work of the service provider.

The different practice is explained below with the aid of an example. By way of example, a rollover sensor 4 produces a signal which is assessed by an evaluation logic unit in the control device 5 as 80% likelihood of an accident. This accident probability is already very high. An emergency signal with a delay time of just 4 seconds is therefore started. The driver is informed about the initiated emergency call and the countdown and does not terminate it if he has been injured as a result of the accident which has actually occurred. The transmission device then sends the emergency call after 4 seconds. This does not result in any appreciable delays.

If, by contrast, the rollover sensor 4 produces a signal that is likewise assessed as 80% likelihood of an accident by the evaluation logic unit in the control device, so that the emergency call is started with a countdown phase of 4 seconds but without an accident subsequently occurring, the driver can terminate the emergency call within 4 seconds on the basis of the information that the emergency call has been initiated and the countdown has been started if he has emerged from the situation without injury. In this case, no emergency call is transmitted and the drawbacks of the prior art are avoided, on the basis of which an emergency call which has been sent can possibly be cancelled again.

As a result, the invention makes it possible to use even nonexplicit initiation signals for sending an emergency call, so that, more sensor signals from the sensors 2, 3, 4 can be considered and hence a greater range of emergencies can be covered. Since the driver or a vehicle occupant is able to terminate an emergency call within the delay time on the basis of nonexplicit initiation signals, the number of unnecessary emergency calls—which could sometimes cripple the rescue system overall—is nevertheless kept down.

The invention claimed is:

1. A method for initiating an automatic emergency call by a controller, in which an emergency signal is initiated when an initiation threshold is reached based on sensor signals, the method comprising:

initiating, by the controller, an emergency call when the initiation threshold is reached based on the sensor signals, assessing, by the controller, reliability of the sensor signals determining, by the controller, a delay time based on the reliability of the sensor signals, the delay time and reliability having an inverse relationship with respect to each other, and delaying transmission of the emergency call based on the determined delay time.

2. The method as claimed in claim 1, wherein during the delay time further sensor signals are evaluated, and if a reliable sensor signal is present then the delay time is shortened.

3. The method as claimed in claim 1, wherein the transmission of an emergency call can be confirmed before the delay time elapses.

4. The method as claimed in claim 1, wherein termination of an automatically initiated emergency call requires double confirmation.

5. The method as claimed in claim 4, wherein after a first confirmation the delay time is extended.

6. The method as claimed in claim 1, wherein during the delay time a communication device is activated to transmit the emergency call.

7. An apparatus for initiating an automatic emergency call comprising:

a control device which initiates an emergency call when an initiation threshold is reached based on the sensor signals, assesses the reliability of the sensor signals, determines a delay time based on the reliability of the sensor signals, and delays transmission of the emergency call by a delay device and a transmission device based on the determined delay time, wherein the delay time and reliability have an inverse relationship with respect to each other.

8. The apparatus as claimed in claim 7, further comprising an input device for the purpose of terminating the transmission of an emergency call using two different actuation devices.

* * * * *